United States Patent
Yan et al.

(10) Patent No.: US 12,073,486 B1
(45) Date of Patent: Aug. 27, 2024

(54) REVERSIBLE WATERMARKING METHOD FOR OBLIQUE PHOTOGRAPHY THREE-DIMENSIONAL MODELS WITH CONTROLLABLE ACCURACY

(71) Applicant: Lanzhou Jiaotong University, Gansu (CN)

(72) Inventors: Haowen Yan, Gansu (CN); Liming Zhang, Gansu (CN); Jingzhong Li, Gansu (CN); Xiaomin Lu, Gansu (CN); Weifang Yang, Gansu (CN); Pengbin Wang, Gansu (CN); Ziyi Zhang, Gansu (CN)

(73) Assignee: LANZHOU JIAOTONG UNIVERSITY, Lanzhou (CN)

( * ) Notice: Subject to any disclaimer, the term of this patent is extended or adjusted under 35 U.S.C. 154(b) by 0 days.

(21) Appl. No.: 18/610,374

(22) Filed: Mar. 20, 2024

(30) Foreign Application Priority Data

Apr. 26, 2023 (CN) .......................... 202310463290.2

(51) Int. Cl.
*G06T 1/00* (2006.01)
*G06F 21/16* (2013.01)
(Continued)

(52) U.S. Cl.
CPC ............ *G06T 1/0021* (2013.01); *G06F 21/16* (2013.01); *G06T 17/00* (2013.01); *G06V 10/44* (2022.01); *G06V 10/764* (2022.01)

(58) Field of Classification Search
CPC ....... G06T 1/0021; G06T 17/00; G06V 10/44; G06V 10/764; G06F 21/16
See application file for complete search history.

(56) References Cited

U.S. PATENT DOCUMENTS

| 8,498,443 B2 * | 7/2013 | Ono .................. H04N 1/32154 |
| | | 382/162 |
| 2008/0159586 A1 | 7/2008 | Van Leest et al. |

(Continued)

FOREIGN PATENT DOCUMENTS

| CN | 102663668 A | 9/2012 |
| CN | 104574289 A | 4/2015 |

(Continued)

OTHER PUBLICATIONS

Qiu, Yinguo, et al. "Rich-information watermarking scheme for 3D models of oblique photography." Multimedia Tools and Applications 78 (2019): 31365-31386.*
Notification to Grant Patent Right for Invention from SIPO in 202310463290.2 dated Sep. 2, 2023.
Retrieval report from SIPO in 202310463290.2 dated Aug. 30, 2023.

(Continued)

*Primary Examiner* — Shefali D Goradia
(74) *Attorney, Agent, or Firm* — Piloff Passino & Cosenza LLP; Rachel K. Piloff; Sean A. Passino (57) ABSTRACT

The disclosure provides a reversible watermarking method for the oblique photography three-dimensional models with controllable accuracy. According to the disclosure: firstly, by using the global stability of the average included angle of vertex normal vector, the feature points of the oblique photography three-dimensional model are extracted; secondly, the mapping relationship is established by the ratio of the distance between feature points and non-feature points, and the vertexes are grouped, and each group consists of a feature point corresponding to several non-feature points; finally, the spherical coordinate system is constructed by taking the feature points as the coordinate origin in grouping, and the watermark is embedded by modifying the radius of the coordinate system.

3 Claims, 6 Drawing Sheets

(51) Int. Cl.
  *G06T 17/00* (2006.01)
  *G06V 10/44* (2022.01)
  *G06V 10/764* (2022.01)

(56) References Cited

U.S. PATENT DOCUMENTS

2013/0259294 A1    10/2013   Mehta et al.
2020/0279084 A1*    9/2020   Davis .................... G06K 7/1456
2020/0311505 A1*   10/2020   Kamath ........... G06K 19/06037

FOREIGN PATENT DOCUMENTS

CN    108335256 A        7/2018
CN    114092306 A    *   2/2022

OTHER PUBLICATIONS

Zhang Liming et al., "A Blind Watermarking Algorithm for Copyright Protection of Vector Geospatial Data Under Controllable Errors Based on DFT," Jul. 2015, pp. 990-994, vol. 40, No. 7.
Xu Tao et al., "A Copyright Protection System of 3D Mesh Models Library Based on Digital Watermarking Technology," Dec. 2012, pp. 59-62, vol. 32. No. 6.
Shuai Wang et al., "A Zero-watermarking Algorithm for Vector Geographic Data Based on Feature Invariants," Sep. 2022.
Zhu Lili, "Digital Watermarking for 3D Model Based on Geometric Characteristic," Mar. 2014.
Zhang Liming et al., "On Digital Watermarking Algorithms for Vector Geospatial Data," Aug. 2015.
Enlarged copies of this present application's figs. 2A-2C and color copies of this application's figs. 3A-3B for the examiner.

* cited by examiner

FIG. 1

GIS
MAP

GIS
MAP

REVERSIBLE WATERMARKING METHOD FOR OBLIQUE PHOTOGRAPHY THREE-DIMENSIONAL MODELS WITH CONTROLLABLE ACCURACY

CROSS-REFERENCE TO RELATED APPLICATIONS

This application claims priority to Chinese Patent Application No. 202310463290.2, filed on Apr. 26, 2023, the contents of which are hereby incorporated by reference.

TECHNICAL FIELD

The disclosure belongs to a field of geospatial data security, and in particular to a reversible watermarking method for oblique photography three-dimensional models with controllable accuracy.

BACKGROUND

In recent years, photogrammetry technology has developed rapidly. Oblique photography three-dimensional model is a three-dimensional model capturing surface features by using oblique photography, and is capable of providing accurate terrain and features information and accurate positioning of the surface features. At present, oblique photogrammetry is widely used in positioning services, building modeling and urban landscape planning because of its advantages of high efficiency, wide range and strong sense of reality, which has high production cost and use value. At present, three-dimensional modeling based on the oblique photogrammetry has become the development trend of three-dimensional construction of city-level real scene. However, with the rapid use, exchange and sharing of data, the security of data has attracted more and more attention from the society. How to encrypt three-dimensional models and promote data sharing has become an urgent problem in three-dimensional application fields. In order to meet requirements of copyright protection and accuracy of the oblique photography three-dimensional model, it is necessary to study technical means capable of giving consideration to both copyright protection and accuracy control, promoting data sharing and better serving three-dimensional China construction.

Digital watermarking technology is a cutting-edge information security technology, and is considered as an effective solution to protect the copyright of three-dimensional models. The digital watermarking technology uses data itself as a carrier through a specific algorithm, and integrates watermark information with the data to hide information such as copyright owners and data users. At present, the digital watermarking technology has been widely used in copyright protections of video, audio and two-dimensional geographic data. The digital watermarking technology is suitable for copyright identification and use tracking afterwards. Once the data is leaked or stolen, the information detected from the data becomes a strong basis for responsibility identification. Generally, digital products in need of protection are capable of being embedded with watermarks through certain methods and data processing methods according to the use environment and robustness requirements, and the data is capable of being protected by the digital watermarking technology. At present, in the research of copyright protection methods for the oblique photography three-dimensional model, there are usually methods based on elevation difference sorting, scale invariant features, main object axis, and centroid distance between modulation vertex and its adjacent vertexes. However, these methods cannot realize an accuracy control of restored data for the digital watermarking method of oblique photography three-dimensional model.

Feature points of the oblique photography three-dimensional model refer to points representing basic geometric or texture features of the oblique photography three-dimensional model, the feature points are stable global features, and don't change with the change of coordinate system. In order to improve the security and robustness of the method, the disclosure uses a feature point extraction method based on the average angle of local normal vectors.

Watermark embedding in groups is a common method to resist cropping attack. Vertexes of the oblique photography three-dimensional model are divided into several independent groups through the mapping relation of modulus length ratio of the vertexes, and embedding watermark in groups is capable of effectively resisting the cropping attack.

The disclosure comprehensively utilizes advantages of feature point extraction and vertex grouping processing, and proposes a reversible watermarking method for the oblique photography three-dimensional models by using feature point grouping, so as to realize copyright protection for the oblique photography three-dimensional models during storage, transmission and use.

SUMMARY

Aiming at a fact that most of the existing reversible watermarking methods for oblique photography three-dimensional models can only recover single-precision data and are difficult to meet the needs of different users, the disclosure provides a reversible watermarking method for the oblique photography three-dimensional models with controllable accuracy. According to the disclosure: firstly, by using the global stability of the average included angle of vertex normal vector, the feature points of the oblique photography three-dimensional model are extracted; secondly, the mapping relationship is established by the ratio of the distance between feature points and non-feature points, and the vertexes are grouped, and each group consists of a feature point corresponding to several non-feature points; finally, the spherical coordinate system is constructed by taking the feature points as the coordinate origin in grouping, and the watermark is embedded by modifying the radius of the coordinate system. In this method, the watermark is extracted at different positions in the radius, and different radii are obtained to recover the data, so as to realize the controllable accuracy of the data. Experiments show that the reversible watermarking method for the oblique photography three-dimensional models with controllable accuracy proposed in the disclosure is capable of realizing the controllable accuracy of recovered data, and the method has good robustness against translation, rotation, cropping and simplification attacks.

In order to achieve the above objective, the present disclosure adopts a following technical scheme.

A reversible watermarking method for the oblique photography three-dimensional models with controllable accuracy includes four parts: watermark information generation, watermark embedding, watermark extraction and data recovery.

Steps of watermark information generation are as follows:
S1, reading an original watermark image, and scrambling the original watermark image by Arnold scrambling; and S2, binarizing an obtained watermark image to obtain a binary sequence.

Steps of watermark embedding are as follows:

S3, reading vertexes of an original oblique photography three-dimensional model, and finding normal vectors of points;

S4, calculating an included angle between each vertex and a point normal vector in a neighborhood, and obtaining an average value of the included angles between normal vectors and the vertexes;

S5, setting a threshold, and respectively classifying the vertexes in a feature point set and a non-feature point set;

S6, calculating module lengths of two types of points, and calculating a spatial distance ratio from non-feature points to feature points;

S7, establishing a mapping relationship with the minimum value of a distance ratio, and mapping all non-feature points to corresponding feature points according to a ratio relationship;

S8, grouping all vertexes by the established mapping relationship, that is, each group consists of a feature point and several corresponding non-feature points;

S9, converting rectangular coordinates of all non-feature points into spherical coordinates with corresponding feature points as the coordinate origins in groups, calculating a watermark index value with a radius, and embedding the watermark into the radius; and S10, performing watermark embedding on all groups of the oblique photography three-dimensional model according to above steps to obtain an oblique photography three-dimensional model with watermark.

Steps of watermark extraction are as follows:

S11, performing same processing as S3-S9 in the watermark embedding stage on the oblique photography three-dimensional model with watermark obtained in S10 to obtain a radius value in a spherical coordinate system constructed after grouping; and S12, calculating the watermark index value by the radius, and extracting the watermark.

Steps of data recovery are as follows:

S13, using different values to obtain different radius values from the radius obtained in S11, calculating corresponding rectangular coordinates, and recovering to obtain oblique photography three-dimensional models with different accuracy; and S14, ending.

The method provided by the disclosure is advanced and scientific, ensures the effective extraction of watermark information, and has good robustness, and is capable of providing a new scheme for the safe use and copyright protection of oblique photography three-dimensional models. Experiments show that this method is capable of achieving the controllable accuracy of recovered data, and at the same time, this method has good robustness to attacks such as translation, rotation, cropping and simplification, and has good use value.

BRIEF DESCRIPTION OF THE DRAWINGS

In order to explain the technical scheme in the embodiment of the present disclosure or the prior art more clearly, the drawings needed in the description of the embodiment or the prior art are briefly introduced below. Obviously, the drawings in the following description are only schematic diagrams of the present disclosure, and other drawings may be obtained according to the provided drawings without creative work for ordinary people in the field.

DETAILED DESCRIPTION OF THE EMBODIMENTS

The technical scheme in the embodiment of the present disclosure is described clearly and completely with reference to the attached drawings. Obviously, the described embodiment is only a part of the embodiment of the present disclosure, but not the whole embodiment. Based on the embodiments in the present disclosure, all other embodiments obtained by ordinary technicians in the field without creative labor belong to the scope of protection of the present disclosure.

Figure 1:
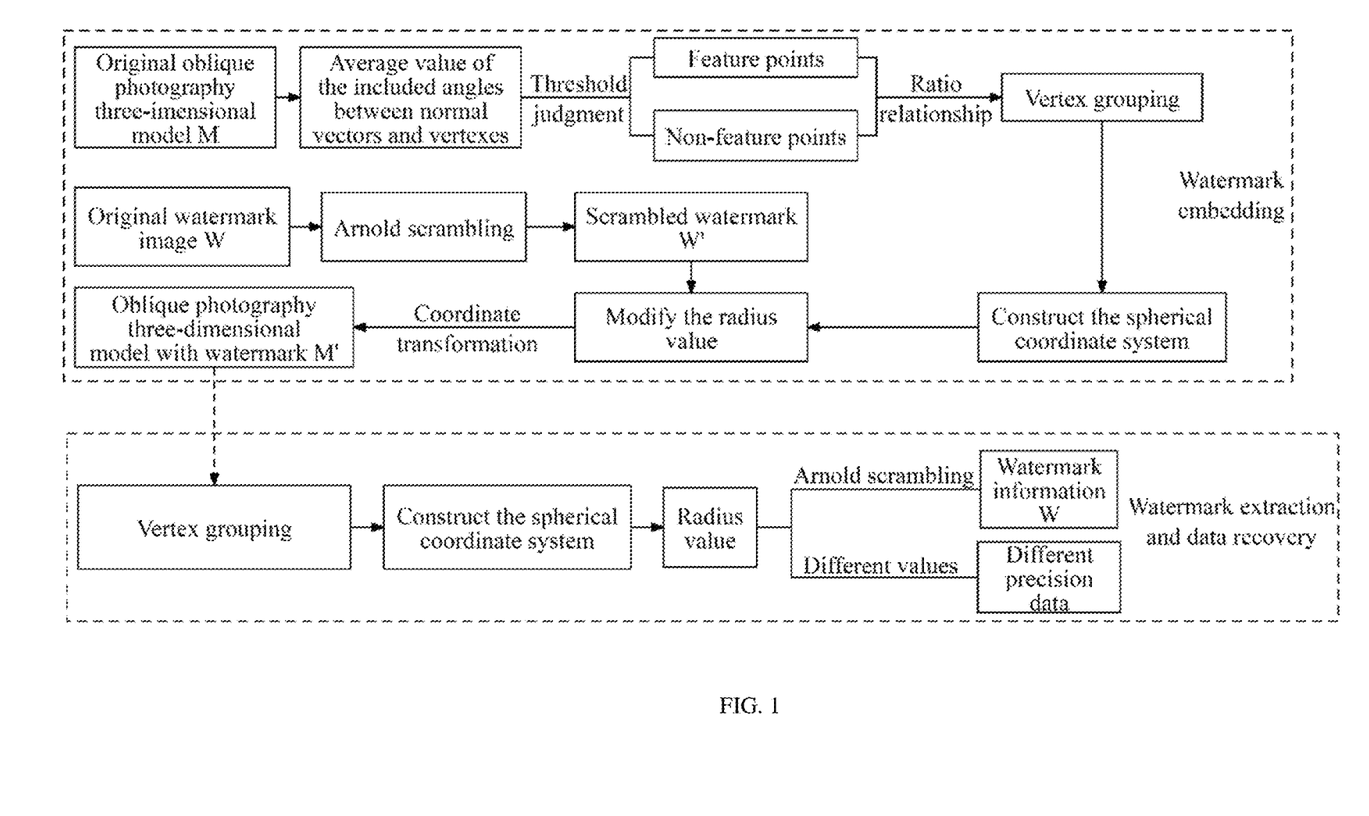
FIG. 1 is a flow chart of a reversible watermarking method for oblique photography three-dimensional models with controllable accuracy provided by the present disclosure.

In order to explain in detail the technical content, structural features, achieved purposes and achieved effects of the present disclosure, the following is a detailed description with specific embodiments (with reference to FIG. 1).

1. Watermark Information Generation

Figure 2A:
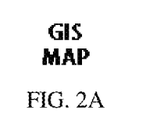
FIG. 2A shows an original watermark used in the experiment provided by the present disclosure.
Figure 2B:
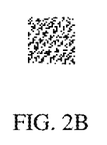
FIG. 2B shows a scrambled image by Arnold scrambling provided by the present disclosure.
Figure 2C:
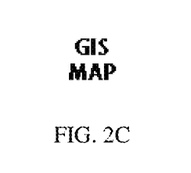
FIG. 2C shows a recovered watermark image provided by the present disclosure.

Step 1, reading an original watermark image and scrambling the original watermark image (FIG. 2A) by Arnold scrambling to obtain a scrambled watermark image (FIG. 2B);

Step 2, then binarizing the scrambled watermark image to obtain a binary watermark sequence $W=\{w[j]\}$, $j \in [0, 1-1]$.

2. Watermark Embedding

Figure 3A:
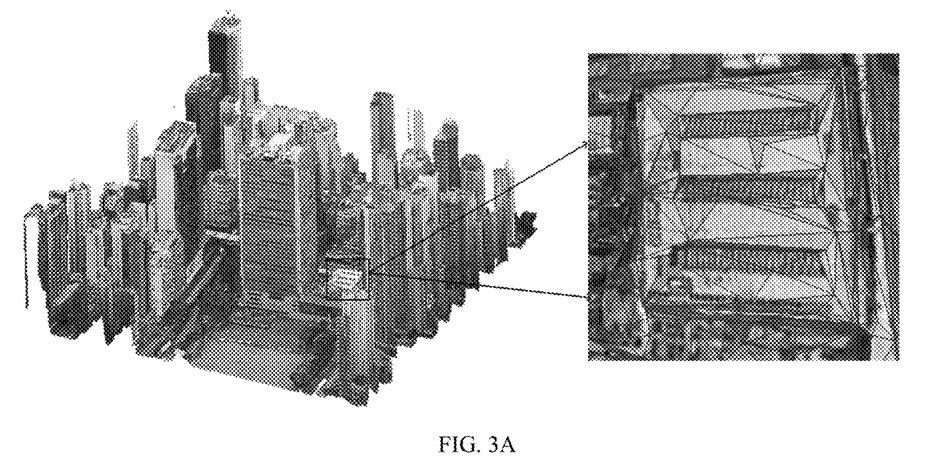
FIG. 3A shows an original model and its partial detail effects provided by the present disclosure.
Figure 3B:
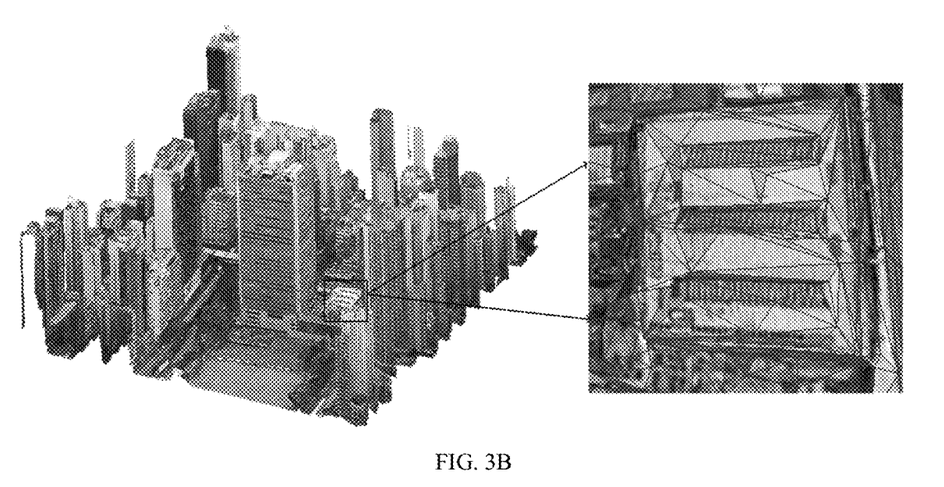
FIG. 3B shows a watermarked model and its partial detail effects provided by the present disclosure.

Step 3, data preprocessing: reading watermark vertexes of the original oblique photography three-dimensional model (FIG. 3A), finding a normal vector $\vec{n_i}$ of a point in a vertex set P of the oblique photography three-dimensional model, and calculating an included angle $\theta_{ij}$ between the point and a point normal vector in its neighborhood, as well as an average value $\bar{\theta}$ of the included angles of point normal vectors;

Step 4, setting the threshold $\varepsilon$: when $\bar{\theta} \geq \varepsilon$, considering the point and its neighborhood have large transformation amplitude and good feature performance, and classifying the point in the feature point set; when $\bar{\theta} < \varepsilon$, considering the point and its neighborhood have small and relatively flat transformation amplitude and poor feature performance, and classifying the point in the non-feature point set;

Step 5, calculating module lengths of $p_i$ and $p_j$, and calculating spatial distance ratios from $p_j$ to each $p_i$ as follows:

$$K = \frac{\sqrt{x_i^2 + y_i^2 + z_i^2}}{\sqrt{x_j^2 + y_j^2 + z_j^2}},$$

where $(x_i, y_i, z_i)$ and $(x_j, y_j, z_j)$ represent coordinate values of points $p_i$ and $p_j$;

Step 6, selecting a minimum value from an obtained distance ratio K, and determining corresponding relationships between points in two different point sets with the minimum value; grouping and mapping all non-feature points to corresponding feature points according to a ratio relationship;

Step 7, grouping all vertexes by the established mapping relationship, that is, each group consists of a feature point and several corresponding non-feature points;

Step 8, converting rectangular coordinates of all non-feature points into spherical coordinates with the corresponding feature points as coordinate origins. The calculation method is as follows:

$$\begin{cases} r_l = \sqrt{(x_j - x_i)^2 + (y_j - y_i)^2 + (z_j - z_i)^2} \\ \theta_l = \arctan\left(\dfrac{y_j - y_i}{x_j - x_i}\right) \\ \varphi_l = \arccos\left(\dfrac{z_j - z_i}{r_l}\right) \end{cases},$$

where $p_i=(x_i, y_i, z_i)$ and $p_j=(x_j, y_j, z_j)$ respectively represent rectangular coordinates of feature points and non-feature points, $\{0 \leq l \leq n-1\}$;

Step 9, embedding the watermark into the radius of the spherical coordinate system of the grouped non-feature points, and the formula for calculating the watermark index is $w_l = w[r_l \% W_{length}]$. The embedding calculation formula is as follows:

$$r'_l = \dfrac{Int(r_l \times 10^t) + [w_l + Modf(r_l \times 10^t)]/10}{10^t},$$

in the formula, "[ ]" represents rounding, t determines an embedding position of the watermark, and multiple embeddings are possible, and Int and Modf respectively represent functions of taking the integer part and the decimal part; and Step 10, obtaining rectangular coordinates by performing coordinate transformation on $r'_l$. The calculation formula is as follows:

$$\begin{cases} x' = x_i + r'_l \times \sin\theta_l \times \cos\theta_l \\ y' = y_i + r'_l \times \sin\theta_l \times \sin\varphi_l, \\ z' = z_i + r'_l \times \cos\varphi_l \end{cases}$$

in the formula, (x', y', z') represents rectangular coordinates of the non-feature point $p_j$ with watermark. Until all the groups complete the watermark embedding, an oblique photography three-dimensional model with watermark is obtained (as shown in FIG. 3B).

3. Watermark Extraction

Step 11, performing same processing procedure as the Step 3-the Step 8 in the watermark embedding stage on the oblique photography three-dimensional model with watermark obtained in the Step 10 to obtain a radius value in the spherical coordinate system constructed after grouping; and Step 12, calculating the watermark index value by the radius, and converting the extracted watermark information $w'_l$ into a watermark image. The calculation formula is as follows:

$$w'_l = [Mod\, f(r'_l \times 10^t) \times 10].$$

4. Data Recovery

Step 13, obtaining different $r_l$ values from different t values. The calculation formula is as follows:

$$r_l = \dfrac{Int((r'_l \times 10^t) + [Modf(r'_l \times 10^t)]}{10^t},$$

Step 14, calculating the corresponding rectangular coordinates (x, y, z) to recover the original data with different accuracy. The calculation formula is as follows:

$$\begin{cases} x = x_i + r_l \times \sin\theta_l \times \cos\theta_l \\ y = y_i + r_l \times \sin\theta_l \times \sin\varphi_l. \\ z = z_i + r_l \times \cos\varphi_l \end{cases}$$

The above description of the disclosed embodiment enables those skilled in the art to make or use the invention. Many modifications to these embodiments are obvious to those skilled in the art, and the general principles defined herein may be implemented in other embodiments without departing from the spirit or scope of the invention. Therefore, the present disclosure is not to be limited to the embodiment shown herein, but is to be accorded the widest scope consistent with the principles and novel features disclosed herein.

What is claimed is:

1. A reversible watermarking method for the oblique photography three-dimensional models with controllable accuracy, comprising four parts: watermark information generation, watermark embedding, watermark extraction and data recovery:

steps of watermark information generation are as follows:

S1, reading an original watermark image, and scrambling the original watermark image by Arnold scrambling; and S2, binarizing an obtained watermark image to obtain a binary sequence $W=\{w[j]\}, j \in [0, 1-1]$;

steps of watermark embedding are as follows:

S3, reading vertexes of an original oblique photography three-dimensional model, and finding normal vectors of points;

S4, calculating an included angle between each vertex and a point normal vector in a neighborhood, and obtaining an average value $\overline{\theta}$ of the included angles between normal vectors and the vertexes;

S5, setting a threshold, and respectively classifying the vertexes in a feature point set and a non-feature point set;

setting a threshold $\varepsilon$, when $\overline{\theta} \geq \varepsilon$, considering the point and its neighborhood have large transformation amplitude and good feature performance, and classifying the point in the feature point set; when $\overline{\theta} < \varepsilon$, considering the point and its neighborhood have small and relatively flat transformation amplitude and poor feature performance, and classifying the point in the non-feature point set;

S6, calculating module lengths of two types of points, and calculating a spatial distance ratio from non-feature points to feature points;

calculating module lengths of $p_i$ and $p_j$, and calculating spatial distance ratios from $p_j$ to each $p_i$ as follows:

$$K = \frac{\sqrt{x_i^2 + y_i^2 + z_i^2}}{\sqrt{x_j^2 + y_j^2 + z_j^2}},$$

wherein $(x_i, y_i, z_i)$ and $(x_j, y_j, z_j)$ represent coordinate values of points $p_i$ and $p_j$;

S7, establishing a mapping relationship with the minimum value of a distance ratio, and mapping all non-feature points to corresponding feature points according to a ratio relationship;

selecting a minimum value from an obtained distance ratio K, and determining corresponding relationships between points in two different point sets with the minimum value; grouping and mapping all non-feature points to corresponding feature points according to a ratio relationship;

S8, grouping all vertexes by an established mapping relationship, that is, each group comprises a feature point and several corresponding non-feature points;

S9, converting rectangular coordinates of all non-feature points into spherical coordinates with corresponding feature points as the coordinate origins in groups, calculating a watermark index value with a radius, and embedding the watermark into the radius;

converting rectangular coordinates of all non-feature points into spherical coordinates with the corresponding feature points as coordinate origins, and a calculation method is as follows:

$$\begin{cases} r_l = \sqrt{(x_j - x_i)^2 + (y_j - y_i)^2 + (z_j - z_i)^2} \\ \theta_l = \arctan\left(\frac{y_j - y_i}{x_j - x_i}\right) \\ \varphi_l = \arccos\left(\frac{z_j - z_i}{r_l}\right) \end{cases},$$

wherein $p_i=(x_1, y_i, z_i)$ and $p_j=(x_j, y_j, z_j)$ respectively represent rectangular coordinates of feature points and non-feature points;

embedding the watermark into the radius of the spherical coordinate system of the grouped non-feature points, and a formula for calculating the watermark index is $w_l = w[r_l \% \ w_{length}]$; an embedding calculation formula is as follows:

$$r'_l = \frac{Int(r_l \times 10^t) + [w_l + Modf(r_l \times 10^t)]/10}{10^t},$$

in the formula, "[ ]" represents rounding, t determines an embedding position of the watermark, and multiple embeddings are possible, and Int and Modf respectively represent functions of taking an integer part and a decimal part;

S10, performing watermark embedding on all groups of the oblique photography three-dimensional model according to above steps to obtain an oblique photography three-dimensional model with watermark;

obtaining rectangular coordinates by performing coordinate transformation on $r'_l$; the calculation formula is as follows:

$$\begin{cases} x' = x_i + r'_l \times \sin\theta_l \times \cos\theta_l \\ y' = y_i + r'_l \times \sin\theta_l \times \sin\varphi_l \\ z' = z_i + r'_l \times \cos\varphi_l \end{cases},$$

in the formula, (x', y', z') represents rectangular coordinates of the non-feature point $p_j$ with watermark; until all the groups complete the watermark embedding, an oblique photography three-dimensional model with watermark is obtained;

steps of watermark extraction are as follows:

S11, performing same processing as S3-S9 in the watermark embedding stage on the oblique photography three-dimensional model with watermark obtained in S10 to obtain a radius value in a spherical coordinate system constructed after grouping; and S12, calculating the watermark index value by the radius, and extracting the watermark;

steps of data recovery are as follows:

S13, using different values to obtain different radius values from the radius obtained in S11, calculating corresponding rectangular coordinates, and recovering to obtain oblique photography three-dimensional models with different accuracy; and S14, ending.

2. The reversible watermarking method for the oblique photography three-dimensional models with controllable accuracy according to claim 1, wherein in S10, the watermark embedding operation is completed by using watermark information generated in S1-S2.

3. The reversible watermarking method for the oblique photography three-dimensional models with controllable accuracy according to claim 1, with an application scenario also comprising copyright protection of three-dimensional grid data, wherein copyrights of the oblique photography three-dimensional models are authenticated and applied by using watermarking technology.

* * * * *